United States Patent
Urakami et al.

(10) Patent No.: US 6,923,844 B2
(45) Date of Patent: Aug. 2, 2005

(54) GAS SEPARATION METHOD AND DEVICE

(75) Inventors: Tatsushi Urakami, Tsukuba (JP); Tooru Nagasaka, Tsuchiura (JP); Masato Kawai, Kofu (JP); Akihiro Nakamura, Kofu (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 0 days.

(21) Appl. No.: 10/495,630

(22) PCT Filed: Nov. 21, 2002

(86) PCT No.: PCT/JP02/12161

§ 371 (c)(1),
(2), (4) Date: May 14, 2004

(87) PCT Pub. No.: WO03/045536

PCT Pub. Date: Jun. 5, 2003

(65) Prior Publication Data

US 2005/0000355 A1 Jan. 6, 2005

(30) Foreign Application Priority Data

Nov. 27, 2001 (JP) ........................................ 2001-361381

(51) Int. Cl.[7] ............................................. B01D 53/047
(52) U.S. Cl. .................. 95/12; 95/22; 95/96; 95/127; 95/130; 96/111; 96/113; 96/130; 96/143
(58) Field of Search ........................... 95/8, 12, 19, 22, 95/96–106, 127, 130; 96/111, 113, 114, 130, 133, 143, 144

(56) References Cited

U.S. PATENT DOCUMENTS

| | | | | |
|---|---|---|---|---|
| 4,190,424 A | | 2/1980 | Armond et al. | |
| 4,386,945 A | * | 6/1983 | Gardner | 95/98 |
| 4,770,676 A | * | 9/1988 | Sircar et al. | 95/99 |
| 4,775,394 A | * | 10/1988 | Yamano et al. | 95/101 |
| 4,986,835 A | * | 1/1991 | Uno et al. | 95/99 |
| 5,026,406 A | * | 6/1991 | Kumar | 95/101 |
| 5,248,322 A | * | 9/1993 | Kumar | 95/101 |
| 5,354,346 A | * | 10/1994 | Kumar | 95/101 |
| 5,833,737 A | * | 11/1998 | Tamura et al. | 95/98 |
| 5,846,298 A | * | 12/1998 | Weist, Jr. | 95/138 |
| 6,136,070 A | * | 10/2000 | Sato et al. | 95/98 |

FOREIGN PATENT DOCUMENTS

| | | |
|---|---|---|
| JP | 01-184016 | 7/1989 |
| JP | 07-267612 | 10/1995 |
| JP | 2002-126435 | 5/2002 |
| JP | 2002-306918 | 10/2002 |
| WO | 02/085496 A1 | 10/2002 |

* cited by examiner

*Primary Examiner*—Robert H. Spitzer
(74) *Attorney, Agent, or Firm*—Nixon & Vanderhye P.C.

(57) ABSTRACT

A gas separation method and apparatus that recovers efficiently principal gas components from a feed gas that includes a plurality of components, and enables supplying the product gases continuously at a stable flow rate and component concentration. A first separation step using a first adsorption column and a second separation step using a second adsorption column are provided, a circulating feed gas, consisting of the recovered exhaust gases discharged in each of the steps and the feed gas, is used as a gas to be separated. The outflow rate and component concentration of a second gas product are maintained constant by controlling the outflow rate of the first gas product.

16 Claims, 3 Drawing Sheets

GAS SEPARATION METHOD AND DEVICE

This application is the US national phase of international application PCT/JP02/12161, filed in English on 21 Nov. 2002, which designated the US. PCT/JP02/12161 claims priority to JP Application No.2001-361381 filed 27 Nov. 2001. The entire contents of these applications are incorporated herein by reference.

BACKGROUND OF THE INVENTION

1. Field of the Invention

The present invention relates to a method in which a valuable rare gas is separated and recovered from a mixed gas consisting of valuable rare gases such as krypton and xenon, and in particular, to a gas separation method and apparatus in which a valuable rare gas is recovered, and separated at a high purity from a mixed gas that includes mainly a valuable rare gas and nitrogen by using a pressure swing adsorption method, and then circulated and reused.

2. Description of Related Art

In the process of manufacturing semiconductor devices such as semiconductor integrated circuits, liquid crystal panels, solar panels, magnetic disks and the like, there has been used an apparatus for generating plasma in a rare gas atmosphere in order to carry out various processes for semiconductor device by the plasma.

These plasma processes are carried out follows: 1. substrates are set in a processing chamber in a nitrogen atmosphere, 2. when plasma is generated using high frequency discharge, a rare gas flows into the chamber, 3. when the substrates are taken out wherefrom, the chamber is purged by charging nitrogen gas.

Conventionally, argon has predominantly been used as the rare gas to be employed in such treatments, krypton and xenon are coming to the fore for more sophisticated applications.

Krypton and xenon are extremely expensive, since the existence ratio of them in air is very small and the process to separate them from air is complicated, so that the semiconductor manufacturing processes using the rare gases are economically feasible, only on the premise that used gases are recovered, circulated and reused.

A method and apparatus is disclosed in Japanese Unexamined Patent Application, First Publication No. 2002-126435, in which a valuable rare gas in a nitrogen gas is continuously recovered at a high purity and in a recovery rate of 95 to 99% or more by using a pressure swing adsorption method(below, referred to as PSA).

The method disclosed in the publication combines an equilibrium pressure swing adsorption process (below, referred to as nitrogen enriching PSA) and a rate-dependent pressure swing adsorption process (below, referred to as rare gas enriching PSA). In nitrogen enriching PSA, a valuable rare gas, which is the easily adsorbable component, is removed by using the difference in the amounts of adsorbed gases at equilibrium between nitrogen and the valuable rare gas, and the nitrogen gas, which is the hardly adsorbable component, is discharged outside the system as an off-gas. In rare gas enriching PSA, the nitrogen, which is the easily adsorbable component, is removed by using the difference in adsorption rates between the nitrogen and the valuable rare gas, and the valuable rare gas, which is the hardly adsorbable component, is extracted as product gas.

In this method, the gases desorbed in the regeneration step of the nitrogen enriching PSA and the rare gas enriching PSA are all recovered in a feed gas storage tank, mixed with a feed gas, and recirculated by using a compressor (below, the gas circulated by the compressor is referred to as the circulating feed gas). Thereby, it is possible to increase the recovery rate.

In the semiconductor manufacturing apparatus that is the object of the gas separation method of the present invention, a step in which a semiconductor substrate is fed into and removed from a processing chamber and a step in which various processes are carried out using plasma are repeated in sequence. The feed and removal of the substrates are mainly carried out in a nitrogen atmosphere, while in contrast the plasma processing is carried out in a rare gas atmosphere. Thus, the flow rate and the component concentration of the gas to be separated (below, the gas discharged from the semiconductor manufacturing apparatus is referred to as the feed gas), which is the object of the present gas separation method, are always fluctuating. The required time for the feed and removal and the time during which the plasma processing is carried out differ depending on the semiconductor manufacturing processes, and the flow rate of the rare gas required for the plasma processes and the flow rate of the nitrogen used as the purge gas is not always constant. Therefore, in the gas separation method of the present invention, measures for dealing with the fluctuations in the flow rate and composition of the feed gas are necessary. In addition, the rare gas recovered by the present separation apparatus must be continuously supplied to the semiconductor manufacturing apparatus at a required flow rate and component concentration, which depends on the semiconductor manufacturing processes.

In contrast, in the conventional method described above, it is not preferable that the component concentrations in the circulating feed gas introduced into the nitrogen enriching PSA and rare gas enriching PSA fluctuate due to the influence of the flow rate and component concentrations of the feed gas. For example, increasing the nitrogen concentration in the circulating feed gas is preferable because enriching the nitrogen in the nitrogen enriching PSA becomes easy. However, enriching a valuable rare gas in the rare gas enriching PSA, becomes difficult, and the component concentration of the valuable rare gas extracted as product decreases. In contrast, increasing the component concentration of the valuable rare gas in the circulating feed gas makes enriching the valuable rare gas in the rare gas enriching PSA, become easy. However, increasing the valuable rare gas concentration becomes difficult for the nitrogen enriching PSA and the component concentration of the valuable rare gas in the nitrogen increases, which in turn means that the recovery rate of the valuable rare gas decreases. Therefore, to supply the valuable rare gas constantly at a desired flow rate and component concentration, a control mechanism that adjusts and maintains the component concentration in the circulating feed gas is indispensable.

In consideration of the problems described above, it is an object of the present invention to provide a gas separation method and apparatus that, in separating principal gas components from a feed gas that includes a plurality of components, principal gas components can be recovered at a high efficiency by adjusting and maintaining the component concentration in the circulating feed gas within a suitable concentration range, and can supply the valuable rare gas continuously at a constant flow rate and component concentration.

SUMMARY OF THE INVENTION

The gas separation method of the present invention is a method in which principal gas components are separated from a feed gas that includes at least a first gas component and a second gas component using a pressure swing adsorption method, comprising: a first separation step in which the first gas component is separated as a first gas product by using a first adsorbent that easily adsorbs the first gas component and hardly adsorbs the second gas component; and a second separation step in which the second gas component is separated as a second gas product by using a second adsorbent that easily adsorbs the first gas component and hardly adsorbs the second gas component; wherein in the first and second separation steps, a circulating feed gas is used as the gas to be separated, where the circulating feed gas consists of recovered discharge gases that are discharged when the adsorbents are regenerated and the feed gas; and based on at least one of the component concentrations in the circulating feed gas and the pressure of the gas delivery path, the second gas product is extracted at a constant outflow rate and component concentration by controlling the outflow rate of the first gas product.

The gas separation method of the present invention is a method in which principal gas components are separated from a feed gas that includes at least a first gas component and a second gas component using a pressure swing adsorption method comprising: a first separation step in which the first gas component is separated as a first gas product by using a first adsorbent that hardly adsorbs the first gas component and easily adsorbs the second gas component; and a second separation step in which the second gas component is separated as a second gas product by using a second adsorbent that easily adsorbs the first gas component and hardly adsorbs the second gas component; and wherein in the first and second separation steps, the circulating feed gas being used as the gas to be separated, where the circulating feed gas consists of recovered discharge gases that are discharged when the adsorbents are regenerated and the feed gas; a second gas supplied from the outside is mixed with the circulating feed gas; and based on at least one of the flow rate and the component concentration of the first gas product, the second gas product is extracted at a constant outflow rate and component concentration by controlling the supply flow rate of the second gas component from the outside.

The gas separation method of the present invention is a method in which principal gas components are separated from a feed gas that includes at least a first gas component and a second gas component using a pressure swing adsorption method comprising: a first separation step in which the first gas component is separated as a first gas product by using a first adsorbent that hardly adsorbs the first gas component and easily adsorbs the second gas component; and a second separation step in which the second gas component is separated as a second gas product by using a second adsorbent that easily adsorbs the first gas component and hardly adsorbs the second gas component; and wherein in the first and second separation steps, the circulating feed gas is used as the gas to be separated, where the circulating feed gas consists of recovered discharge gas that is discharged when the adsorbents are regenerated and the feed gas; a second gas supplied from the outside is mixed with the circulating feed gas; and based on at least one of the component concentration in the circulating feed gas and the pressure in the gas delivery path, the second gas product being extracted at a constant outflow rate and component concentration by controlling the supply flow rate of the second gas component from the outside.

The gas separation method of the present invention can be applied to a feed gas in which the first gas component is nitrogen and the second gas component is krypton or xenon.

The gas separation apparatus of the present invention is an apparatus that separates principal gas components from a feed gas that includes at least a first gas component and a second gas component by using a pressure swing adsorption method, comprising: a feed gas storage tank into which the feed gas flows, a compressor for compressing a circulating feed gas from the feed gas storage tank, a first separation unit having a first adsorption column for separating the first gas component in the circulating feed gas from the compressor as a first gas product, and a second separation unit having a second adsorption column that separates a second gas component in the circulating feed gas as a second gas product; and the gas separation apparatus being formed such that: a first adsorbent that hardly adsorbs the first gas component and easily adsorbs the second gas component is used in a first adsorption column; a second adsorbent that easily adsorbs the first gas component and hardly adsorbs the second component gas is used in a second adsorption column; the circulating feed gas, consisting of recovered discharge gases that are discharged when these adsorbents are regenerated and are mixed with the feed gas, flows into the first or second adsorption columns as gas to be separated; and based on at least one of the component concentration in the circulating feed gas and the pressure of the gas delivery path, it is possible to adjust the outflow rate of the first gas product.

The gas separation apparatus of the present invention is an apparatus that separates principal gas components from a feed gas that includes at least a first gas component and a second gas component by using a pressure swing adsorption method, comprising: a feed gas storage tank into which the feed gas flows, a compressor that compresses the circulating feed gas from the feed gas storage tank, a first separation unit having a first adsorption column that separates a first gas component in the circulating feed gas from the compressor as a first gas product, and a second separation unit having a second adsorption column that separates a second gas component in the circulating feed gas as a second gas product; and the gas separation apparatus being formed such that: a first adsorbent that hardly adsorbs the first gas component and easily adsorbs the second gas component is used in the first adsorption column; a second adsorbent that easily adsorbs the first gas component and hardly adsorbs the second gas component is used in the second adsorption column; the circulating feed gas, consisting of the recovered discharge gases that are discharged when these adsorbents are regenerated and the feed gas, flows into the first or second adsorption columns as gas to be separated; a second gas component can be supplied to the circulating feed gas from the outside; and based on at least one of the outflow rate and the component concentration of the first gas product, it is possible to adjust the flow rate of a second gas component supplied from the outside.

The gas separation apparatus of the present invention is an apparatus that separates principal gas components from a feed gas that includes at least a first gas component and a second gas component by using a pressure swing adsorption method, comprising: a feed gas storage tank into which the feed gas flows, a compressor for compressing the circulating feed gas from the feed gas storage tank, a first separation unit having a first adsorption column that separates the first gas component in the circulating feed gas from the compressor as a first gas product; and a second separation unit having a second adsorption column that separates the second gas component in the circulating feed gas as a second gas product; the gas separation apparatus being formed such that: a first adsorbent that hardly adsorbs the first gas component and easily adsorbs the second gas component is used in the first adsorption column; a second adsorbent that easily adsorbs the first gas component and hardly adsorbs the second component gas is used in the second adsorption column; the circulating feed gas, consisting of the recovered discharge gases that are discharged when these adsorbents are regenerated and the feed gas, flows into the first or second adsorption columns as gas to be separated; a second gas component can be supplied to the circulating feed gas from the outside; and based on at least one of the component concentration in the circulating feed gas and the pressure of the gas delivery path, adjusting the outflow rate of a second gas product supplied from the outside.

The gas separating apparatus of the present invention is structured so that it is possible to return a first gas product and/or a second gas product to a circulating feed gas based on the outflow rate of at least one of the first gas product and the second gas product.

In the gas separating apparatus of the present invention, the first adsorbent that fills the first adsorption column is activated carbon, and the second adsorbent that fills the second adsorption column is an adsorbent that can separate krypton or xenon from a mixed gas consisting of krypton or xenon and nitrogen by using the difference in adsorption rates between nitrogen and krypton or xenon. Specifically, zeolite can be used as the adsorbent because the molecular diameter of both gases is close to the pore size of the adsorbent. In particular, zeolites such as Na-A type zeolite, ferrierite, chabazite, having an effective pore diameter of 0.4 nm (nanometers), are preferably used.

In the drawings, the used reference numerals denote the following:
1 feed gas storage tank
2 compressor
3, 33 first separation unit
4, 34 second separation unit
11 first adsorption column
21 second adsorption column

DETAILED DESCRIPTION OF THE INVENTION

Figure 1:
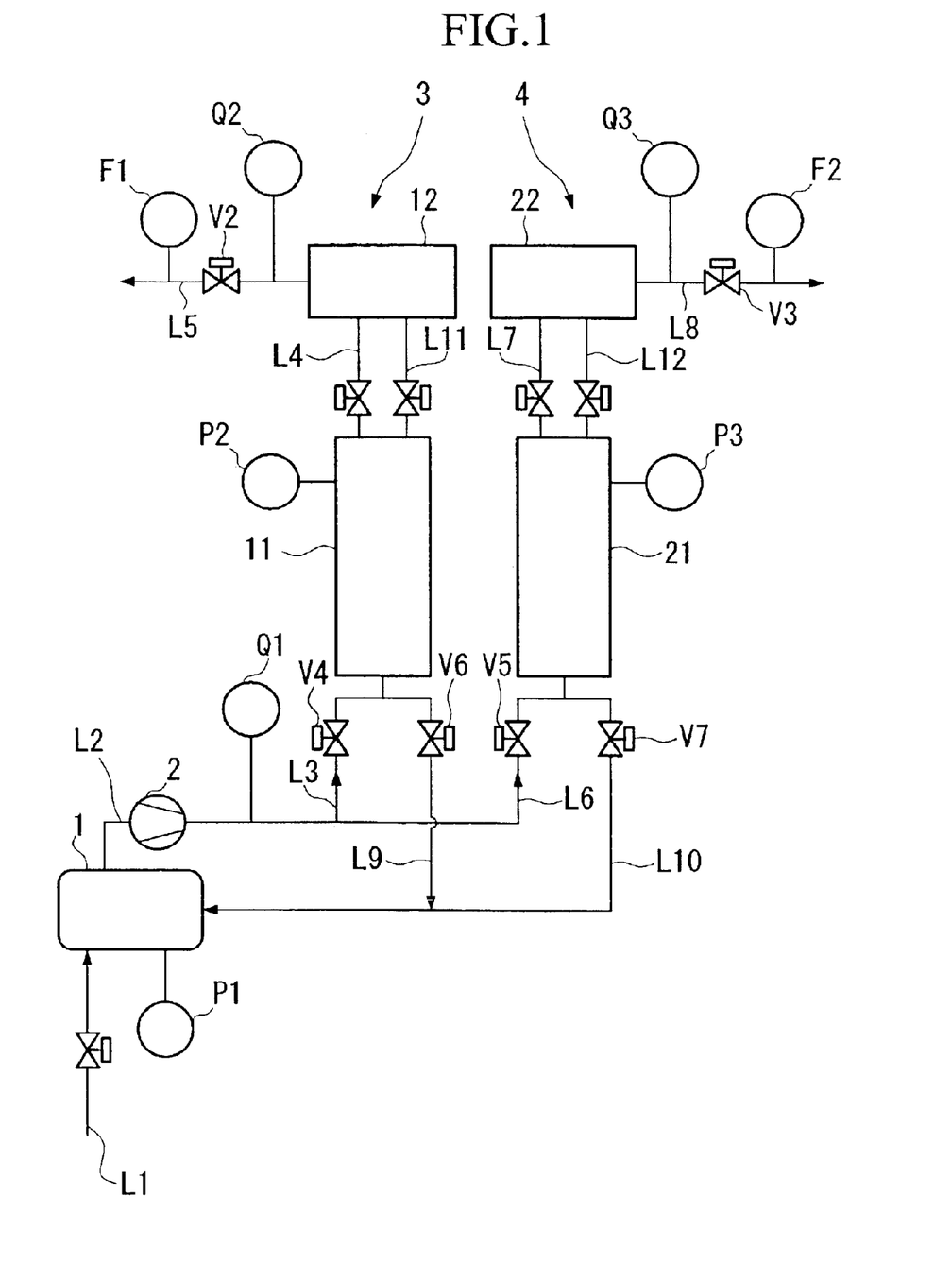
FIG. 1 is a schematic system drawing showing the first embodiment of the gas separation method of the present invention.

FIG. 1 shows a first embodiment of the gas separation apparatus of the present invention, and the gas separation apparatus shown here is an apparatus that separates principal gas components from a feed gas by using a pressure swing adsorption method, and consists of a feed gas storage tank 1 into which the feed gas is introduced, a pressure detecting part P1 that detects the pressure in the feed gas storage tank 1, a compressor 2 that compresses the circulating feed gas, a component concentration detecting part Q1 that detects the component concentration of the circulating feed gas, a first separation unit 3 that separates a first gas component in the circulating feed gas from the compressor 2 as a first gas product, and a second separation unit 4 that separates a second gas in the circulating feed gas as a second gas product.

The first separation unit 3 consists of a first adsorption column 11 that separates a first gas component in the circulating feed gas as a first gas product, a pressure detecting part P2 that detects the pressure in the first adsorption column 11, a first gas product storage tank 12 that stores the first gas product, a flow rate detecting part F1 that detects the outflow rate of the first gas product from this storage tank 12, a component concentration detecting part Q2 that detects the component concentration of the first gas product, a control valve V2 that controls the outflow rate of the first gas product based on the component concentration in the circulating feed gas detected by the component concentration detecting part Q1, and a first recovered discharge gas return path L9 that returns the recovered discharge gas from the first adsorption column 11 to the feed gas storage tank 1.

In the first adsorption column 11, a first adsorbent that hardly adsorbs the first gas component and easily adsorbs the second gas component is used.

The second separation unit 4 consists of a second adsorption column 21 that separates a second gas component in the circulating feed gas as a second gas product, a pressure detecting part P3 that detects the pressure in the second adsorption column 21, a second gas product storage tank 22 that stores the second gas product, a flow rate detecting part F2 that detects the outflow rate of the second gas product from the storage tank 22, a component concentration detecting part Q3 that detects the component concentration of the second gas product, a control valve V3 that controls the outflow rate of the second gas product, and a second recovered discharge gas return path L10 that returns the recovered discharge gas from the second adsorption column 21 to the feed gas storage tank 1.

In the second adsorption column 21, a second adsorbent that easily adsorbs the first gas component and hardly adsorbs the second gas component is used.

The reference symbols L11 and L12 denote paths by which the gas products from the storage tanks 12 and 22 are introduced into the adsorption columns 11 and 21 in order to purge the adsorption columns 11 and 21.

Next, a first embodiment of the gas separation method of the present invention will be explained as an example of the case in which this gas separation apparatus is used.

In the gas separation method explained below, a mixed gas that includes nitrogen as the first gas component and krypton as the second gas component is used as the feed gas (instead of krypton, xenon can also be used as the second gas component).

Activated carbon is used as the first adsorbent that fills the first adsorption column 11, and zeolite is used as the second adsorbent that fills the second adsorption column 21. The activated carbon, which is the first adsorbent, has the property of selectively adsorbing krypton and hardly adsorbing nitrogen. Zeolite, which is the second adsorbent, has the property of selectively adsorbing nitrogen, and hardly adsorbing krypton.

The feed gas that includes nitrogen and krypton is introduced into the feed gas storage tank 1 via the path L1.

Next, the gas (circulating feed gas) in the feed gas storage tank 1 is introduced into the compressor 2 via the path L2, and after being compressed there, is supplied to the first adsorption column 11 via the path L3 as the gas to be separated.

In the first adsorption column 11, the krypton, which is the easily adsorbable component, in the circulating feed gas is adsorbed by the first adsorbent (activated carbon), and the nitrogen, which is the hardly adsorbable component, flows out from the first adsorption column 11.

The outflow gas that flows out of the first adsorption column 11 via the path L4 is introduced into the first gas product storage tank 12, and is next supplied as nitrogen product (first gas product) via the path L5 (adsorption step).

Before the first adsorbent in the first adsorption column reaches adsorption saturation, the supply of the circulating feed gas to the first adsorption column 11 is stopped by the operation of the switching valves V4 and V5, and the circulating feed gas is supplied to the second adsorption column 21 via path L6 as gas to be separated.

In the second adsorption column 21, the easily adsorbed nitrogen in the circulating feed gas is adsorbed by the second adsorbent (zeolite), and the hardly adsorbed krypton flows out of the second adsorption column 21.

The outflow gas that flows out of the second adsorption column 21 via the path L7 is introduced into the second gas product storage tank 22, and is next supplied as krypton product (second gas product) via the path L8 (adsorption step).

While the first adsorption column 11 is in the adsorption step, the regeneration step is being carried out in the second adsorption column 21. In this regeneration step, the blow valve V7 is opened, and the gas in the second adsorption column 21 is returned to the feed gas storage tank 1 via the second recovered discharge gas return path L10 as recovered discharge gas.

Thereby, the pressure in the second adsorption column 21 is decreased, the adsorbed nitrogen is desorbed, and the second adsorbent is regenerated.

While the second adsorption column 21 is in the adsorption step, the regeneration step is being carried out in the first adsorption column 11. In the regeneration step, the blow valve V6 is opened, and the gas in the first adsorption column 11 is returned to the feed gas storage tank 1 via the first recovered discharge gas return path L9 as recovered discharge gas.

Thereby, the pressure in the first adsorption column 11 is decreased, the adsorbed krypton is desorbed, and the first adsorbent is regenerated.

In this gas separation method, while the adsorption step is being carried out in one adsorption column, the regeneration step is being carried out in the other adsorption columns 11 and 21, the gas separation step is carried out continuously.

In the gas separation method of the present embodiment, it is possible to use a method in which the outflow rate of the nitrogen product is controlled by the control valve V2 based on the component concentration in the circulating feed gas detected by the component concentration detecting part Q1.

For example, when the nitrogen concentration in the circulating feed gas is detected by the component concentration detecting part Q1 and the detected value is equal to or greater than a predetermined set range, the opening of the control valve V2 is enlarged depending on the difference between the detected value and the upper limiting value of the set range, and the outflow rate of the nitrogen product is increased.

Thereby, because the flow rate of the nitrogen gas discharged from the first adsorption column 11 to outside the apparatus system becomes large, the nitrogen concentration in the circulating feed gas that is circulating within the apparatus system can be decreased.

When the nitrogen concentration in the circulating feed gas becomes equal to or less than the predetermined set range, the opening of the control valve V2 is reduced depending on the difference between the detected value and the lower limiting value of the set range, and the outflow rate of the nitrogen product is decreased.

Thereby, because the nitrogen gas discharged from the first adsorption column 11 to outside the apparatus system becomes small, it is possible to increase the nitrogen concentration in the circulating feed gas that is circulating within the apparatus system.

In this manner, by controlling the outflow rate of the nitrogen product, it is possible to adjust and maintain the component concentrations in the circulating feed gas continuously within a constant range, and thus it is possible to supply at a constant flow rate and component concentration the krypton product from the path L8. In addition, adjusting and maintaining the component concentrations in the circulating feed gas within a constant range also stabilizes the component concentration of the nitrogen product, and it is also possible to limit the krypton discharged along with the nitrogen product.

In addition, it is possible to use a method in which the pressure in the feed gas storage tank is detected by the pressure detecting part P1 as the pressure of the gas delivery path, and based on the difference between the detected value and the upper limiting value (or lower limiting value) of the set range, the opening of the control valve V2 is adjusted, and it is possible to control the outflow rate of the nitrogen product.

The pressure in the feed gas storage tank increases in the case that the total of the flow rates of the krypton product and nitrogen product flowing out to outside the system is smaller than the flow rate of the feed gas being introduced into the system. The krypton product supplied to the semiconductor manufacturing apparatus as product is used by the semiconductor manufacturing apparatus and returned to this gas separation apparatus as feed gas, and thus the increase in the pressure in the feed gas storage tank can be considered to be a result of the increase of the nitrogen in the feed gas. Therefore, in the case that an increase in the pressure in the feed gas storage tank is detected by the pressure detecting part P1, the opening of the control valve V2 is enlarged depending on the difference between the detected value and the upper limiting value of the set range, and the outflow rate of the nitrogen product can be increased. Contrariwise, in the case that a decrease in the pressure in the feed gas storage tank is detected by the pressure detecting part P1, the opening of the control valve V2 is decreased depending on the difference between the detected value and the lower limiting value of the set range, and the outflow rate of the nitrogen product is decreased.

In this manner, by controlling the outflow rate of the nitrogen product based on the pressure in the feed gas storage tank, it is possible to adjust and maintain the pressure in the feed gas storage tank within a constant range. Adjusting the pressure of the feed gas storage tank within a constant range also relates to maintaining the component concentrations in the circulating feed gas within a constant range. Therefore, it becomes possible to supply krypton product at a constant flow rate and component concentration.

In addition, it is also possible to use a method in which the pressure of each of the adsorption columns 11 and 21 is detected by the pressure detecting parts P2 and P3 as the pressure of the gas delivery path, and based on the difference between this detected value and the upper limiting value (or lower limiting value) of the set range, the opening of the control valve V2 is adjusted, and the outflow rate of the nitrogen product is controlled.

The adsorption pressure in each of the adsorption columns (the finally attained pressure in the adsorption step) rises or falls depending on the component concentrations in the circulating feed gas. The activated carbon that fills the first adsorption column has the property of selectively adsorbing krypton and hardly adsorbing nitrogen, and thus when the nitrogen concentration in the circulating feed gas increases, the adsorption pressure in the first adsorption column increases (because the nitrogen component, the component that is hardly adsorbed, increases), and when the nitrogen concentration decreases, the adsorption pressure decreases (because the nitrogen component, the component that is hardly adsorbed, decreases). In addition, the zeolite that fills the second adsorption column has the property of selectively adsorbing nitrogen and hardly adsorbing krypton, and thus when the nitrogen concentration in the circulating feed gas increases, the adsorption pressure of the second adsorption column decreases (because the nitrogen concentration, the component that is easily adsorbed, increases) and when the nitrogen concentration decreases, the adsorption pressure increases (because the nitrogen component, the component that is easily adsorbed, decreases).

Therefore, the pressure in each of the adsorption columns is detected, and the outflow rate of the nitrogen product is controlled based on the detected value of the pressure, and thereby an effect that is identical to the case in which control is carried out by detecting the component concentrations in the circulating feed gas can be expected. In addition, even when control is carried out based on the pressure in the product gas storage tank 12 and 22, the identical effect that is identical to the case in which the control based on pressure in the adsorption columns 11 and 21 can be expected.

Figure 2:
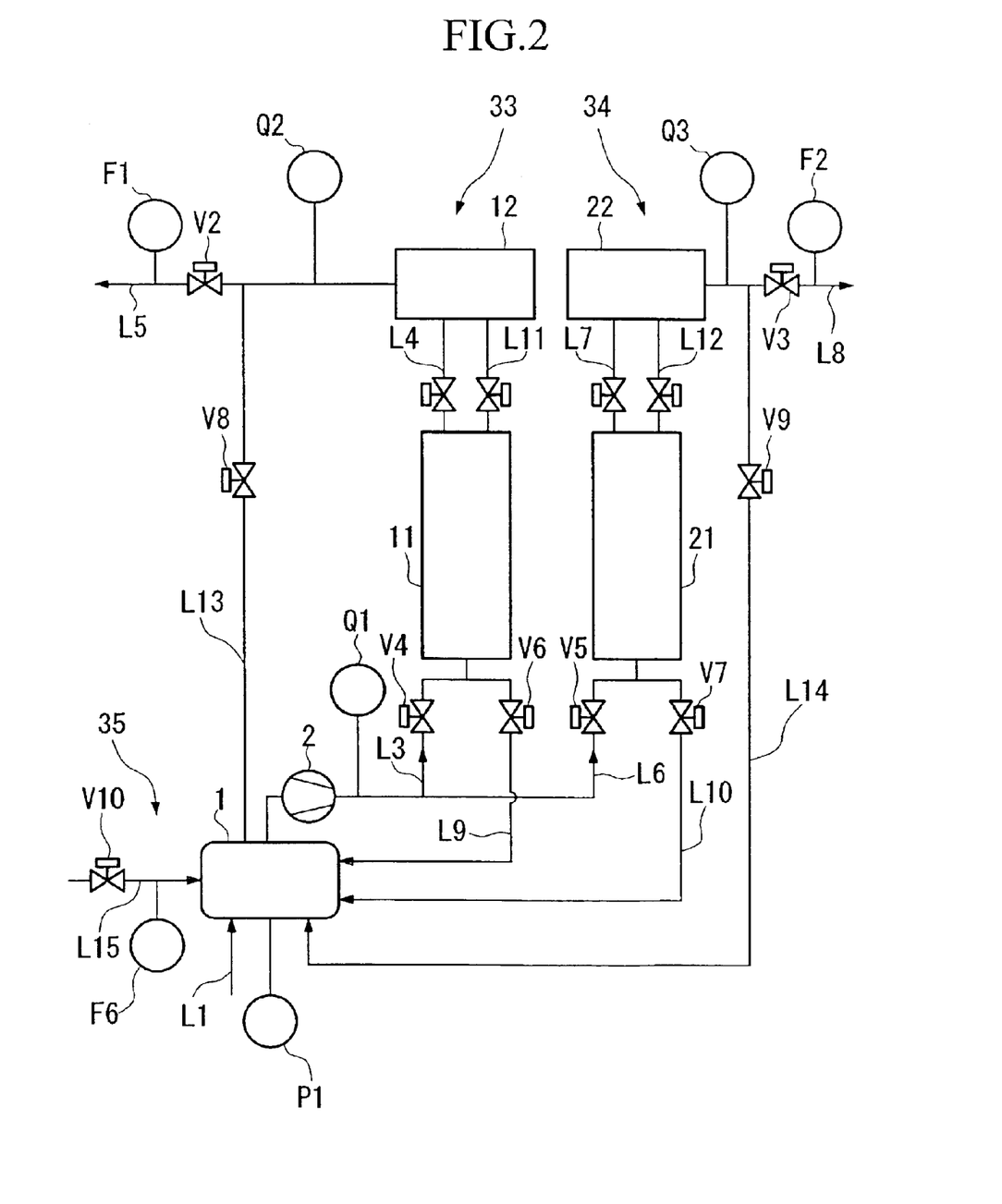
FIG. 2 is a schematic system drawing showing a second embodiment of the gas separation method of the present invention.

FIG. 2 schematically shows the system of the second embodiment of the gas separation apparatus of the present invention. Structures that are identical to those of the gas separation apparatus shown in FIG. 1 have identical reference numerals, and their explanation is omitted.

The gas separation apparatus shown here consists of a feed gas storage tank 1, a compressor 2, a first separation unit 33, a second separation unit 34, and a gas supply part 35 that supplies a gas component supplied from the outside to the feed gas storage tank 1.

The first separation unit 33 provides a first adsorption column 11, a first gas product storage tank 12, a first return path L9, a first gas product return path L13 that returns at least a portion of the first gas product to the feed gas storage tank 1, and a control valve V8 that controls the return flow rate of the first gas product based on the outflow rate of the first gas product set by the control valve V2.

The second separation unit 34 consists of a second adsorption column 21, a second gas product storage tank 22, a second return path L10, a second gas product return path L14 that returns at least a portion of a second gas product to the feed gas storage tank 1, and a control valve V9 that controls the return flow rate of the second gas product based on the outflow rate of the second gas product set by the control valve V3.

The gas supply part 35 consists of a gas supply path L15 that supplies the gas component from the supply source (not illustrated; for example, a gas tank filled with the second gas component to the feed gas storage tank 1), a flow rate detecting part F6 that detects the flow rate of the gas component supplied to the feed gas storage tank 1 via this path L15, and a control valve V10 that controls the supply flow rate of the gas component.

Next, as an example of the case in which this gas separation apparatus is used, a second embodiment of the gas separation method of the present invention will be explained. In the gas separation method explained below, a mixed gas that includes nitrogen as the first gas component and krypton as the second gas component is used as the feed gas.

The krypton loss in the present gas separation method consists of the krypton included in the nitrogen product. In the first adsorption column, the krypton, which is the easily adsorbable component, is adsorbed, and the nitrogen, which is the hardly adsorbable component, is enriched and flows outside the system. Thus, the krypton loss in the present gas separation apparatus is very small. However, when operated continuously for a long time, a decrease in the krypton concentration in the circulating feed gas due to krypton loss and a decrease in the flow rate of the circulating feed gas cannot be avoided, and to supply the krypton product at a constant flow rate and component concentration, compensating for the krypton discharged outside the system is indispensable. In the second embodiment (FIG. 2), a gas supply part 35 that compensates the second gas component is provided. In the second embodiment, by introducing the second gas component into the circulating feed gas, it is possible to prevent both a decrease in the krypton concentration in the circulating feed gas due to krypton loss and a decrease in the circulating feed gas flow rate. Therefore, in the second embodiment, the krypton product supplied to the present gas separation apparatus becomes as-is the krypton flow rate necessary for the semiconductor manufacturing apparatus.

In this gas separation method, the opening of the control valve V10 is adjusted based on the outflow rate and/or the component concentration of the nitrogen product, and it is possible to control the supply rate of krypton from the gas supply part 35.

For example, in the case that the outflow rate of the nitrogen product is detected by the flow rate detector F1 and the outflow rate of the nitrogen product increases above a set value, the opening of the control valve V10 is enlarged depending on the difference between the detected value and the set value, and thereby the supply flow rate of the krypton from the gas supply part 35 is increased. In addition, when the outflow rate of the nitrogen product decreases below a set value, the opening of the control valve V10 is decreased depending on the difference between the detected value and the set value, and thereby the supply flow rate of the krypton from the gas supply part 35 is decreased.

The krypton loss in the present gas separation method is largely dependent on the outflow rate of the nitrogen product. If the outflow rate of the nitrogen product increases, the krypton discharged outside the system along with the nitrogen product increases, and if the outflow rate of the nitrogen product decreases, the krypton discharged outside the system decreases. In the present gas separation method, based on the outflow rate of the nitrogen product described above, the supply flow rate of the krypton from the gas supply part 35 is controlled, and thereby it is possible to prevent both a decrease in the krypton concentration in the circulating feed gas and a decrease in the circulating feed gas. Therefore, it is possible to supply the krypton product at a constant flow rate and component concentration.

In this gas separation method, the opening of the control valve V10 is adjusted based on the pressure of the feed gas storage tank 1 as the gas delivery path, and thus it is possible to control the supply flow rate of the krypton from the gas supply part 35.

For example, in the case that the pressure of the feed gas storage tank 1 is detected by the pressure detecting part P1 and that the detected value is detected to be equal to or less than a predetermined set range, based on the difference between the detected value and the lower limiting value of the set range, the opening of the control valve V10 is enlarged, and thereby the supply flow rate of the krypton from the gas supply part 35 is increased. In the case that the pressure of the feed gas storage tank is detected by the pressure detecting part P1 and the detected value is detected to be equal to or greater than the predetermined set range, the opening of the control valve V10 is decreased, and thereby the supply flow rate of the krypton from the gas supply part 35 is decreased.

In this manner, by controlling the supply flow rate of the gas components from the gas supply part 35, it is possible to maintain the flow rate and the component concentrations in the circulating feed gas constant. Therefore, it is possible to supply the krypton product continuously at a constant flow rate and component concentration.

In this gas separation method, a method can be used in which, based on a set flow rate of the krypton product in the control valve V3, the opening of the control valve V9 is adjusted, and the circulation flow rate of the krypton product is controlled.

In this gas separation method, it is possible to control the circulation flow rate of one among the nitrogen product or the krypton product, or it is possible to control the circulation flow rate of both the nitrogen product and krypton product.

In the semiconductor fabricating apparatus that is the object of the gas separation apparatus of the present invention, the necessary rare gas flow rate differs depending on the semiconductor process carrying out manufacturing. In addition, in the step of introducing and removing the semiconductor substrates, the supply of rare gas is not necessary.

In contrast, in the gas separation apparatus of the present embodiment, the circulating flow rate of the krypton product is controlled based on the outflow rate of the krypton product supplied to the semiconductor manufacturing apparatus, and thus in any of the steps of the semiconductor manufacturing apparatus, it is possible to maintain the component concentration in the circulating feed gas within a constant range.

For example, in the case that the flow rate of the krypton product supplied to the semiconductor manufacturing apparatus is reduced by half, by returning half of the krypton product to the circulating feed gas, it is possible to maintain the component concentration in the circulating feed gas within a constant range.

Therefore, the gas separation apparatus of the present embodiment can be applied to various processes in the semiconductor manufacturing apparatuses, makes possible recovering principal gas components at a high efficiency, and can continuously supply a valuable rare gas at a constant flow rate and component concentration.

The operation described above is effective even during the initial start-up. For example, the product gas manufactured during the initial start-up of the apparatus is insufficient in terms of the product concentration for extract as a product, while in the gas separation apparatus of the present embodiment, it is possible to return all the product gas that has not reached a desired component concentration to the circulating feed gas, which means that it becomes possible to reuse the product gas as feed gas. Therefore, in the gas separation apparatus of the present embodiment, in the initial period of the start-up, the feed gas supply is unnecessary, and in addition, the valuable rare gas is not discharged to outside the system. Therefore, it is possible to reduce the cost of the valuable rare gas necessary during the initial period of the start-up of the apparatus.

EXAMPLES

Example 1

Separation of krypton and nitrogen was carried out using the gas separation apparatus shown in FIG. 1.

The first adsorption column 11 had an inner diameter of 108 mm, a height of 650 mm, and was filled with 2.5 kg of activated carbon.

The second adsorption column 21 had an inner diameter of 154 mm, a height of 650 mm, and was filled with 8.8 kg of an Na-A type zeolite.

A compressor 2 having a capacity of 26 L/min was used (here and below, the flow rate unit (L/min) is at 0° C. at 1 atmosphere). The operational half-cycle of PSA is 250 s.

At the start, a mixed gas consisting of 50% krypton and 50% nitrogen was introduced as the feed gas into the apparatus at 2.0 L/min via path L1, and nitrogen product was extracted at 1.005 L/min from path L5 and krypton product was extracted at 0.995 L/min from the path L8.

Figure 3:
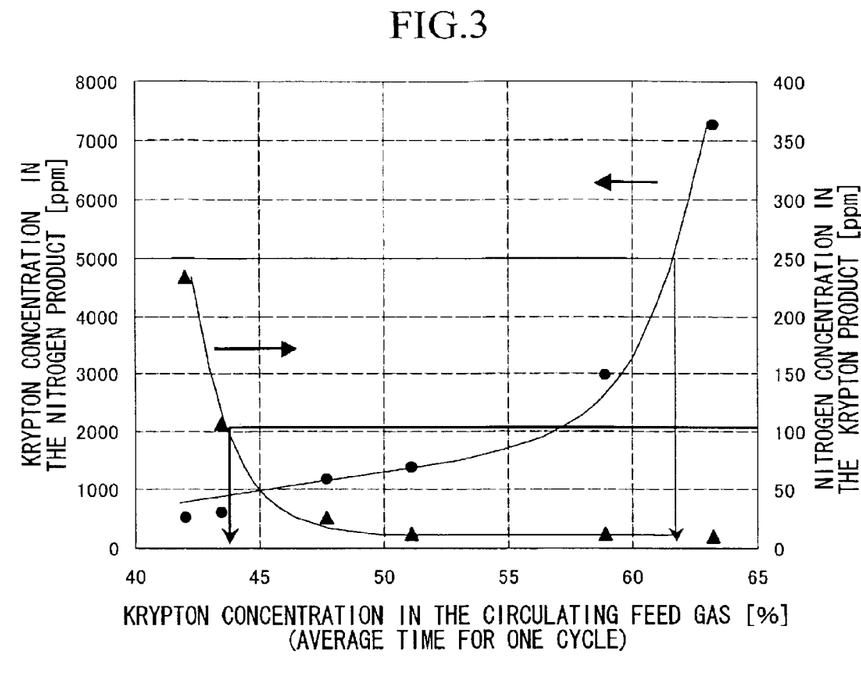
FIG. 3 is a drawing showing the relationship between the krypton concentration in the circulating feed gas; and the krypton concentration in the nitrogen product, and the nitrogen concentration in the krypton product.

First, in order to investigate dependence of the nitrogen product and krypton product on the circulating feed gas concentrations, an experiment was carried out in which the component concentrations in the circulating feed gas were varied from 40% to 65%. The relationship between the circulating feed gas concentrations and each of the product gas concentrations is shown in FIG. 3. As is clear from FIG. 3, the concentration of product gas depends on the circulating feed gas concentrations strongly. It can be understood that to satisfy the condition wherein a krypton concentration in the nitrogen product is equal to or less than 5000 ppm and a nitrogen concentration in the krypton product is equal to or less than 100 ppm, the circulating feed gas concentrations must run within a range of 43% to 62%

Next, a densitometer (concentration detecting part) Q1 that continuously monitors the circulating feed gas concentrations is installed downstream of the compressor 2, and a mass flow controller (control valve V2) that adjusts the outflow rate of the nitrogen product is installed on the path L5.

The densitometer Q1 functions by outputting an instruction value for the concentration using a voltage, and the output of this concentration can be incorporated into a PID controller (not illustrated). In the PID controller, a flow rate that depends on the concentrations is calculated from a calibration curve of the concentrations and flow rate prepared in advance, and an instruction value for this flow rate is output to the mass flow controller V2. The mass flow controller V2 is formed such that the outflow rate of the nitrogen product can be adjusted depending on this instruction value.

At the start, a mixed gas consisting of 50% krypton and 50% nitrogen was introduced into the apparatus at 2.0 L/min as feed gas via path L1, and the nitrogen product was extracted at 1.005 L/min from the path L5. In addition, krypton product was extracted at 0.995 L/min from path L8. The concentrations in the circulating feed gas at this time (here and below, the concentrations in the circulating feed gas indicate the time-averaged concentrations over 1 cycle) consisted of 48% nitrogen and 52% krypton, and the nitrogen concentration in the krypton product was 20 ppm and the krypton concentration in the nitrogen product was 1800 ppm.

In this state, the mixed gas supplied to the apparatus as feed gas was changed to 45% krypton and 55% nitrogen at 2.2 L/min, and continuous operation was carried out.

After the operation described above, the krypton concentration in the circulating feed gas gradually began to decrease. However, in the case that the krypton concentration instruction value for the circulating feed gas measured by the densitometer Q1 was measured to be equal to or less than 50%, the opening of the mass flow controller V2 was set to enlarge, and thus the extraction flow rate of the nitrogen product gradually increased, and the krypton concentration in the circulating feed gas decreased to approximately 47% and increased after that. In contrast, in the case of an instruction that the krypton concentration in the circulating feed gas is to be made equal to or greater than 52%, the opening of the mass flow controller V2 is set to decrease, and thus the krypton concentration in the circulating feed gas did not exceed 56%. Due to this control, the component concentrations in the circulating feed gas were always maintained within a range of 47% to 56%, and it was possible to extract 99.99% of the krypton product stably at 0.995 L/min.

Example 2

An experiment to confirm the long-term stability of the apparatus was carried out by using the gas separation apparatus having the structure shown in FIG. 2. The component mechanisms such as the first adsorption column 11 and the second adsorption column 21 and the operating conditions such as the half-cycle time are identical to those of Example 1. In addition, similarly Example 1, a densitometer (concentration detecting part) Q1 that continuously monitors the circulating feed gas concentrations is provided downstream of the compressor 2, a mass flow controller (control valve V2) that adjusts the outflow rate of the nitrogen product is provided on the path L5, and a mechanism that adjusts the outflow rate of the nitrogen product using a PID controller based on the detected value of the densitometer Q1 was provided.

A krypton tank was installed on the gas supply part 35, and a mass flow controller V10 was installed on the path L15. A pressure detector P1 was installed on the feed gas storage tank 1.

The pressure detector P1 functions by outputting an instruction value for pressure using a voltage, and the output of this pressure can be incorporated into a PID controller (not illustrated). In the PID controller, when the pressure was detected to be equal to or less than 95 kPa, a signal was output to the mass flow controller V10, and the krypton gas was supplied at 0.05 L/min. In addition, when the pressure was detected to be equal to or greater than 110 kPa, a signal to stop the supply of krypton gas was output to the mass flow controller V10.

The experiment was carried out in the following sequence.

The nitrogen product was extracted from path L5 at 1.005 L/min, and the krypton product was extracted from path L8 at 1 L/min. In addition, the krypton product extracted from path L8 was mixed with the nitrogen gas at 1 L/min, and supplied again to the apparatus from path L1 as feed gas. Note that the nitrogen product in path L5 was discharged to the atmosphere as exhaust gas.

In the operation described above, the krypton concentration in the circulating feed gas decreases due to the outflow of krypton included in the nitrogen product. However, based on the krypton concentration in the circulating feed gas, the outflow rate of the first gas product was controlled, and based on the pressure in the feed gas storage tank, the krypton from the gas supply part 35 was controlled. As a result, during approximately one week of continuous operation, the krypton concentration in the circulating feed gas was continuously maintained within a concentration range of 48% to 52%, and it was possible to extract the krypton product at a flow rate of 1 L/min at a component concentration equal to or greater than 99.99%.

Example 3

In the semiconductor manufacturing apparatus that is the object of the present gas separation apparatus, in a plasma process in a krypton atmosphere, a mixed gas consisting of krypton and nitrogen is discharged, and only nitrogen is discharged during the introduction and removal of the substrate. Thus, an experiment that simulates this state was carried out. In the experiment, a gas separation apparatus having a structure identical to that in Example 2 was used.

In the experiment, first a mixed gas consisting of 50% krypton and 50% nitrogen was supplied for 20 minutes at 2 L/min as feed gas, and then an operation in which nitrogen gas was supplied for 10 minutes at 1 L/min was repeatedly carried out.

In the 20 minutes during which the mixed gas consisting of 50% krypton and 50% nitrogen was supplied at 2 L/min as feed gas, the nitrogen product was introduced from path L5 at 1.005 L/min and the krypton product was introduced from path L8 at 1 L/min. In addition, in the 10 minutes during which the nitrogen gas was supplied at 1 L/min, an operation was carried out in which the introduction of the krypton product from path L8 was stopped, and the krypton product was returned to the feed gas storage tank 1 via path L14.

The operation described above was repeatedly carried out, and the krypton concentration in the circulating feed gas was maintained within a concentration range of 48% to 52%, and the concentration of the krypton product supplied from path L8 was continuously equal to or greater than 99.99%

Example 4

The start-up of the apparatus was carried out using a gas separation apparatus identical to that in Example 2.

During the start-up, paths L5 and L8 were closed, nitrogen product from path L13 was returned to the feed gas storage tank 1 at 1.005 L/min and krypton product from path L14 was returned to the feed gas storage tank 1 at 0.995 L/min. In addition, feed gas was not supplied from path L1.

Figure 4:
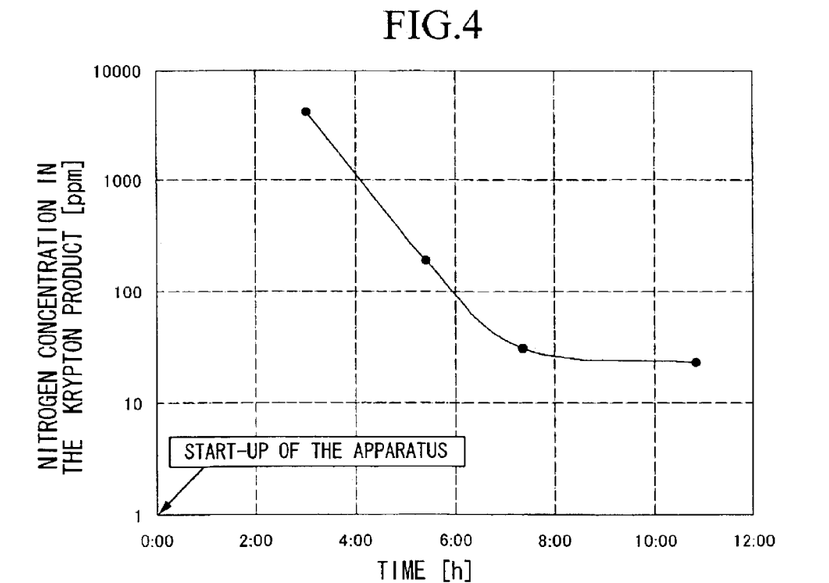
FIG. 4 is a drawing showing the change in the nitrogen concentration in the krypton product during the initial start-up as a function of time.

FIG. 4 shows the change in nitrogen concentration in the krypton that has been returned to the feed gas storage tank 1 from path L14. As shown in FIG. 4, six hours after start-up were necessary for the nitrogen concentration in the krypton to reach 100 ppm or less, which is the gas concentration that makes supply as a product possible. However, during this time, supply of the feed gas was unnecessary. In addition, the concentration of the krypton in the circulating feed gas was continuously maintained within a concentration range of 48% to 52%.

In this manner, it was confirmed that in the gas separation apparatus of the present invention, the apparatus can start in a state in which the krypton product gas can be supplied even when the feed gas was not supplied from the outside during start-up.

As explained above, in the present invention, even in a state wherein the supply flow rate of the product gas changes, or the flow rate and composition of a gases to be separated discharged from an apparatus that uses rare gas changes, by controlling the outflow rate of a first gas product and/or the flow rate of a second gas component supplied from the outside, it is possible to maintain the component concentrations and flow rate of the circulating feed gas within a constant range. Therefore, in a first and second separation step, it is possible to prevent difficulty in recovering the first and second gas components, and it is possible to recover these gas components stably and at high efficiency. Furthermore, it is possible to extract a second gas product at a constant outflow rate and component composition.

What is claimed is:

1. A gas separation method in which principal gas components are separated from a feed gas that includes at least a first gas component and a second gas component using a pressure swing adsorption method, comprising:
    a first separation step in which the first gas component is separated as a first gas product by using a first adsorbent that hardly adsorbs the first gas component and easily adsorbs the second gas component; and
    a second separation step in which the second gas component is separated as a second gas product by using a second adsorbent that easily adsorbs the first gas component and hardly adsorbs the second gas component;
    wherein
    in the first and second separation step, a circulating feed gas is used as the gas to be separated, where the circulating feed gas consists of recovered discharge gases that are discharged when the adsorbents are regenerated and the feed gas; and
    based on at least one of the component concentration in the circulating feed gas and the pressure of the gas delivery path, the second gas product is extracted at a constant outflow rate and component concentration by controlling the outflow rate of the first gas product.

2. A gas separation method in which principal gas components are separated from a feed gas that includes at least a first gas component and a second gas component using a pressure swing adsorption method comprising:
    a first separation step in which the first gas component is separated as a first gas product by using a first adsorbent that hardly adsorbs the first gas component and easily adsorbs the second gas component; and
    a second separation step in which the second gas component is separated as a second gas product by using a second adsorbent that easily adsorbs the first gas component and hardly adsorbs the second gas component; and
    wherein
    in the first and second separation steps, a circulating feed gas being used as the gas to be separated, where the circulating feed gas consists of recovered discharge gases that are discharged when the adsorbents are regenerated, and the feed gas;
    a second gas component supplied from the outside is mixed with the circulating feed gas; and
    based on at least one of the flow rate and the component concentration of the first gas product, the second gas product is extracted at a constant outflow rate and component concentration by controlling the supply flow rate of the second gas component from the outside.

3. A gas separation method in which principal gas components are separated from a feed gas that includes at least a first gas component and a second gas component using a pressure swing adsorption method comprising:
    a first separation step in which the first gas component is separated as a first gas product by using a first adsorbent that hardly adsorbs the first gas component and easily adsorbs the second gas component; and
    a second separation step in which the second gas component is separated as a second gas product by using a second adsorbent that easily adsorbs the first gas component and hardly adsorbs the second gas component; and
    wherein
    in the first and second separation steps, a circulating feed gas is used as the gas to be separated, where the circulating feed gas consists of recovered discharge gases that are discharged when the adsorbents are regenerated, and the feed gas;
    a second component gas supplied from the outside is mixed with the circulating feed gas; and
    based on at least one of the component concentration in the circulating feed gas and the pressure in the gas delivery path, the second gas product being extracted at a constant outflow rate and component concentration by controlling the supply flow rate of the second gas component from the outside.

4. A gas separation method according to any one of the claims 1 to 3, wherein the first gas component of the feed gas is nitrogen and the second gas component of the feed gas is krypton or xenon.

5. A gas separation method according to claim 4, wherein the first adsorbent that fills the first adsorption column is activated carbon, and the second adsorbent that fills the second adsorption column is an adsorbent that can separate krypton or xenon from a mixed gas consisting of krypton or xenon and nitrogen by using the difference in adsorption rates between nitrogen and krypton or xenon.

6. A gas separation step according to claim 5, wherein the pore diameter of the second adsorbent that fills the second adsorption column is approximately 0.4 nm.

7. A gas separation method according to any one of the claims 1 to 3, wherein the first adsorbent that fills the first adsorption column is activated carbon, and the second adsorbent that fills the second adsorption column is an adsorbent that can separate krypton or xenon from a mixed gas consisting of krypton or xenon and nitrogen by using the difference in adsorption rates between nitrogen and krypton or xenon.

8. A gas separation step according to claim 7, wherein the pore diameter of the second adsorbent that fills the second adsorption column is approximately 0.4 nm.

9. A gas separation apparatus that separates principal gas components from a feed gas that includes at least a first gas component and a second gas component by using a pressure swing adsorption method, comprising:
    a feed gas storage tank into which the feed gas flows,
    a compressor for compressing a circulating feed gas from the feed gas storage tank,
    a first separation unit having a first adsorption column for separating the first gas component in the circulating feed gas from the compressor as a first gas product, and a second separation unit having a second adsorption column that separates a second gas component in the circulating feed gas as a second gas product; and the gas separation apparatus being formed such that:

a first adsorbent that hardly adsorbs the first gas component and easily adsorbs the second gas component is used in a first adsorption column;

a second adsorbent that easily adsorbs the first gas component and hardly adsorbs the second component gas is used in a second adsorption column;

the circulating feed gas, consisting of recovered discharge gases that are discharged when these adsorbents are regenerated and the feed gas, flows into the first or second adsorption columns as gas to be separated; and based on at least one of the component concentration in the circulating feed gas and the pressure of the gas delivery path, it is possible to adjust the outflow rate of the first gas product.

10. A gas separation apparatus that separates principal gas components from a feed gas that includes at least a first gas component and a second gas component by using a pressure swing adsorption method, comprising:

a feed gas storage tank into which the feed gas flows, a compressor that compresses a circulating feed gas from the feed gas storage tank, a first separation unit having a first adsorption column that separates a first gas component in the circulating feed gas from the compressor as a first gas product, and a second separation unit having a second adsorption column that separates a second gas component in the circulating feed gas as a second gas product; and the gas separation apparatus being formed such that:

a first adsorbent that hardly adsorbs the first gas component and easily adsorbs the second gas component is used in the first adsorption column;

a second adsorbent that easily adsorbs the first gas component and hardly adsorbs the second gas component is used in the second adsorption column;

the circulating feed gas, consisting of recovered discharge gases that are discharged when these adsorbents are regenerated and the feed gas, flows into the first or second adsorption columns as gas to be separated;

the second gas component can be supplied to the circulating feed gas from the outside; and based on at least one of the outflow rates and the component concentration of the first gas product, it is possible to adjust the flow rate of the second gas component supplied from the outside.

11. A gas separation apparatus that separates principal gas components from a feed gas that includes at least a first gas component and a second gas component by using a pressure swing adsorption method, comprising:

a feed gas storage tank into which the feed gas flows, a compressor for compressing a circulating feed gas from the feed gas storage tank, a first separation unit having a first adsorption column that separates the first gas component in the circulating feed gas from the compressor as a first gas product; and a second separation unit having a second adsorption column that separates the second gas component in the circulating feed gas as a second gas product;

the gas separation apparatus being formed such that:

a first adsorbent that hardly adsorbs the first gas component and easily adsorbs the second gas component is used in the first adsorption column;

a second adsorbent that easily adsorbs the first gas component and hardly adsorbs the second component gas is used in the second adsorption column;

the circulating feed gas, consisting of the recovered discharge gases that are discharged when the adsorbents are regenerated and the feed gas, flows into the first or second adsorption columns as gas to be separated;

the second gas component can be supplied to the circulating feed gas from the outside; and based on at least one of the component concentration in the circulating feed gas and the pressure of the gas delivery path, it is possible to adjust the flow rate of the second gas component supplied from the outside.

12. A gas separation apparatus according to any one of the claims 9 to 11, wherein the first adsorbent that fills the first adsorption column is activated carbon, and the second adsorbent that fills the second adsorption column is an adsorbent that can separate krypton or xenon from a mixed gas consisting of krypton or xenon and nitrogen by using the difference in adsorption rates between nitrogen and krypton or xenon.

13. A gas separation apparatus according to claim 12, wherein the pore diameter of the second adsorbent that fills the second adsorption column is approximately 0.4 nm.

14. A gas separation apparatus according to claim 10 or 11, wherein the apparatus is formed such that at least one of the first gas product and the second gas product can be returned to the circulating feed gas based on the flow rate of at least one of the first gas product and the second gas product.

15. A gas separation apparatus according to claim 14, wherein the first adsorbent that fills the first adsorption column is activated carbon, and the second adsorbent that fills the second adsorption column is an adsorbent that can separate krypton or xenon from a mixed gas consisting of krypton or xenon and nitrogen by using the difference in adsorption rates between nitrogen and krypton or xenon.

16. A gas separation apparatus according to claim 15, wherein the pore diameter of the second adsorbent that fills the second adsorption column is approximately 0.4 nm.

* * * * *